(12) United States Patent
Porowski et al.

(10) Patent No.: US 6,189,768 B1
(45) Date of Patent: Feb. 20, 2001

(54) PROCESS AND APPARATUS FOR PRESSING AN EXTERNAL SLEEVE ONTO A TUBE FOR ENHANCING WELD DESIGN

(75) Inventors: Janek Porowski, Pittsburgh, PA (US); David Lewis, West Ackworth; Wallace Murray, Powder Springs, both of GA (US); Marvin Skiff, El Dorado, AR (US)

(73) Assignee: Columbian Chemicals Company, Marietta, GA (US)

( * ) Notice: Under 35 U.S.C. 154(b), the term of this patent shall be extended for 0 days.

(21) Appl. No.: 09/320,791

(22) Filed: May 27, 1999

(51) Int. Cl.[7] .......................... B23K 31/00; B23K 20/12; B23K 31/02; B23K 1/00; B21D 39/04
(52) U.S. Cl. ........................ 228/136; 228/115; 228/126
(58) Field of Search .................................. 228/136, 126, 228/115

(56) References Cited

U.S. PATENT DOCUMENTS

| | | | | |
|---|---|---|---|---|
| 3,972,548 | * | 8/1976 | Roseen | 285/381 |
| 4,283,615 | * | 8/1981 | Vrillon | 219/66 |
| 4,834,930 | * | 5/1989 | Gemeinhardt | 264/248 |
| 5,098,319 | * | 3/1992 | McGaffigan et al. | 439/874 |
| 5,163,856 | * | 11/1992 | McGaffigan et al. | 439/874 |
| 5,552,039 | * | 9/1996 | McBrayer, Jr. et al. | 210/90 |
| 5,591,415 | * | 1/1997 | Dassel et al. | 422/241 |

* cited by examiner

Primary Examiner—Patrick Ryan
Assistant Examiner—Zidia T. Pittman

(74) Attorney, Agent, or Firm—Garvey, Smith, Nehrbass & Doody, LLC

(57) ABSTRACT

A process and apparatus that would hydraulically compress the external sleeve onto the inner APH tube, without deforming the inner surface of the APH tube during the process. The system would include a heating tube of the type having a continuous wall portion and a bore therethrough; a sleeve positionable around the heating tube, the diameter of the sleeve slightly larger than the diameter of the heating tube; a contracting assembly securably atop the end portions of the heating tube and the surrounding sleeve; an insert positionable within the bore of the tube, for defining a protective member along a portion of the inner wall of the tube; a contour ring moveable along the outer surface of the sleeve for compressing the sleeve wall against the tube wall to define a sealable gap between a portion of the sleeve and a portion of the tube. In the process for securing a seal between the heating tube and the surrounding sleeve, there would be provided a heating tube of the type having a continuous wall portion and a bore therethrough; next, positioning a sleeve around the heating tube, the diameter of the sleeve slightly larger than the diameter of the heating tube; then placing a contracting assembly securably atop the end portions of the heating tube and the surrounding sleeve; providing a contour ring along the outer surface of the sleeve, the contour right carried by the contracting assembly; positioning an insert within the bore of the tube, for defining a non-deformable member along a portion of the inner wall of the tube; and then moving the contour ring along the outer wall of the sleeve to compress the sleeve wall against the tube wall at a point opposite the position of the tube insert, for forming a sealable gap between a portion of the sleeve and a portion of the tube.

20 Claims, 7 Drawing Sheets

PROCESS AND APPARATUS FOR PRESSING AN EXTERNAL SLEEVE ONTO A TUBE FOR ENHANCING WELD DESIGN

BACKGROUND OF THE INVENTION

1. Field of the Invention

The apparatus and process of the present invention relates to connecting a specific heating tube to a surrounding external sleeve. More particularly, the present invention relates to an improved design method for providing a seal tight connection between an air preheater tube and an external sleeve surrounding the tube.

2. General Background of the Invention

In the design of an air preheater tube utilized in heat exchange systems, there is normally provided an APH (air preheater tube) which is positioned within an external sleeve, there being a sealing engagement between the tube and the external sleeve. In order to increase the strength of the connection between the tube and the external sleeve, yet maintain its flexibility and resistance to thermal shock, it is necessary that there be provided a specific gap of less than 0.005 inches between the tube and the external sleeve. One of the problems confronted in this particular type of a process of forming such a seal, is the fact that if the tube is expanded to seal against the inner surface of the surrounding sleeve, then there may result in a less than smooth-straight inner surface of the tube. Therefore, when heated gases carrying particles travel through the tube opening, the result may be the build up of carbon or the like material within the recesses or non-straight portions of the tube which are not conducive to efficient operation of the heat exchange system. Therefore, there is a need in the art for a system and apparatus whereby the tube and the surrounding sleeve may be formed in such a manner as to provide a less than 0.005 inch gap between the surface of the tube and the surface of the surrounding sleeve, yet while maintaining the inner surface of the tube smooth and straight so as to avoid any particle build up on the inner surface of the tube.

In a patentability search conduced on this apparatus and process, there have been cited several patents which may be pertinent to this invention, and these are being submitted herewith in the prior art statement filed.

BRIEF SUMMARY OF THE INVENTION

The apparatus and process of the present invention solves the problems in a simple and straight forward manner. What is provided is a process and apparatus that would hydraulically compress the external sleeve onto the inner APH tube, without deforming the inner surface of the APH tube during the process. The system would include a heating tube of the type having a continuous wall portion and a bore therethrough; a sleeve positionable around the heating tube, the diameter of the sleeve slightly larger than the diameter of the heating tube; a contracting assembly securably atop the end portions of the heating tube and the surrounding sleeve; an insert positionable within the bore of the tube, for defining a non-compressible member along a portion of the inner wall of the tube; a contour ring moveable along the outer surface of the sleeve for compressing the sleeve wall against the tube wall to define a sealable gap between a portion of the sleeve and a portion of the tube. In the process for securing a seal between the heating tube and the surrounding sleeve, there would be provided a heating tube of the type having a continuous wall portion and a bore therethrough; next, positioning a sleeve around the heating tube, the diameter of the sleeve slightly larger than the diameter of the heating tube; then placing a contracting assembly securably atop the end portions of the heating tube and the surrounding sleeve; providing a contour ring along the outer surface of the sleeve, the segmented contour ring carried by the contracting assembly; positioning an insert within the bore of the tube, for defining a non-deformable member along a portion of the inner wall of the tube; and then moving the contour ring along the outer wall of the sleeve to compress the sleeve wall against the tube wall at a point opposite the position of the tube insert, for forming a sealable gap between a portion of the sleeve and a portion of the tube.

Further, the contractor assembly would include a circular collar member wherein there is secured a pair of handle members for securing the assembly onto the upper portion of the sleeve to be contracted wherein there is provided a plurality of wedge shaped contour rings housed within a diverging frustrum portion which are secured to a cylindrical coupling mandrel. There is further provided two rubber toroidal o-rings to assist in maintaining the assembly shape when placing the compression assembly onto the outer sleeve. The mandrel portion includes a threaded shaft member which is utilized to pull the mandrel and contour rings as hydraulic pressure is applied via, for example, a hand pump. As pressure is increased, the shaft and mandrel are pulled towards the converging end of the frustrum housing, which attempts to pull the contour rings. Because of the shape of the contour rings, the rings are forced to rotate slightly as they are pulled, thereby applying a normal force to the sleeve which is compressed as the resulting stress exceeds the material's yield strength. The tube insert member comprises three conical wedges, a setting screw and flat washer. When tightened, the screw attempts to push the washer into the smaller diameter formed by the wedge ends, which applies an expansive force to the wedge member. By doing so, this would secure the insert into the tube inside diameter, which increases the tube rigidity during compression of the sleeve and reduces sleeve spring back thus reducing the residual gap. Prior to the assembly of the contractor being placed on the sleeve, the puller bar of the tensioner would be loosened such that the tool can be assembled on the sleeve neck to be contracted. The axial push of the stud would engage the wedge rings when contracting the sleeve member so that loosening of the puller bar would not be excessive. The wedge ring member would be released only to enable assembly of the tool on the sleeve neck so that the operation would go forward at that point.

In operation, the tube and sleeve ends would be prepared by cleaning the outer diameter of the tube and the inner diameter of the surrounding sleeve; the sleeve would be positioned around the tube. Next, the tube and sleeve ends would be flushed and aligned with one another. Pressure would be released and the hydraulic pump would be connected to the compression assembly. The tube insert would be positioned within the tube end and the setting screw tightened until the pieces firmly held the compression devices in place against the inside of the tube. The compression assembly would be placed over the sleeve and manually held in place utilizing the handles. Hydraulic pump pressure would be increased to approximately 4,000 p.s.i. and held for two minutes. Then it would be increased to 9,000 p.s.i.g. and held for two minutes and finally increased 14,000 p.s.i.g. and held for two minutes. The pressure would be slowly released, and the compression device would be detached from the tube also removing the insert. The residual gap would be checked with a feeler gauge and the recompression would be done a second time if necessary. This process would be completed for each additional tube.

Therefore, it is a principal object of the present invention to provide a process for engaging a sleeve around a heating tube, and to make the surfaces of the tube to a specified sealing gap, without affecting the smoothness or straight inner tube surface.

It is a further object of the present invention to provide an assembly which is positioned on a tube sleeve which has been set upon a tube, so that when the assembly is utilized for mating the surfaces of the tube, an insert within the tube is expanded for preventing any warping of the tube surface as the tube sleeve is compressed there against;

It is a further object of the present invention to provide a process and assembly for forming a specified gap of about 0.005 inches between the outer surface of a tube and the inner surface of a tube sleeve by compressing the tube sleeve around the outer surface of the tube and by maintaining force against the inner surface of the tube so as to prevent any warping or non-smoothing of the inner surface of the tube.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
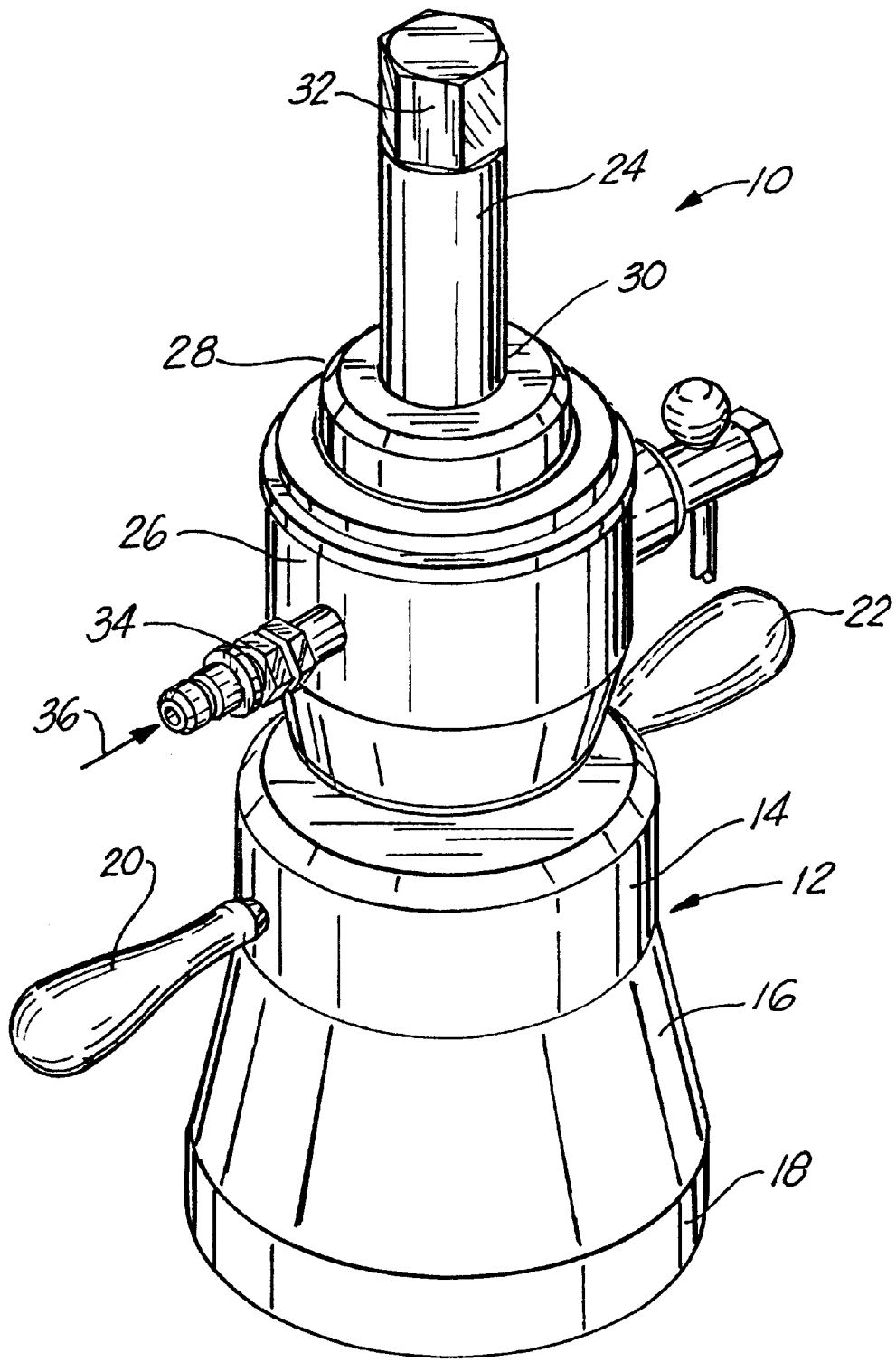
FIG. 1 illustrates the overall view of the contractor assembly of the present invention.

FIGS. 1–10 illustrate the preferred embodiment of the system of the present invention which is utilized to carry out the process of the present invention. In FIG. 1 there is illustrated assembly 10 which is utilized to contract an outer sleeve member against a heating tube positioned therein. In FIG. 1 assembly 10 would comprise an outer circular collar member 12 having a substantial upper vertical side wall 14 leading into a conical side wall 16, and terminating in a lower vertical end portion 18. As illustrated, the upper vertical wall 14 of column member 12 includes a pair of handles 20, 22, for tightly securing collar member 12 onto the tube/sleeve assembly as will be discussed further. Further, as illustrated in FIG. 1, on the exterior, there is included a threaded collet stud member 24 secured into a cylindrically shaped coupling mandrel portion 26 through a continuous bore 28 within the mandrel top portion 30. The upper portion of the threaded collet stud 24 is in the shape of a hex nut 32 for the reasons as will be discussed further. As illustrated further in FIG. 1, there is a nipple assembly 34 which would provide an inlet for hydraulic fluid flowing from a hydraulic line (not illustrated) in the direction of arrow 36 into the assembly for the reasons that will be known.

Figure 2:
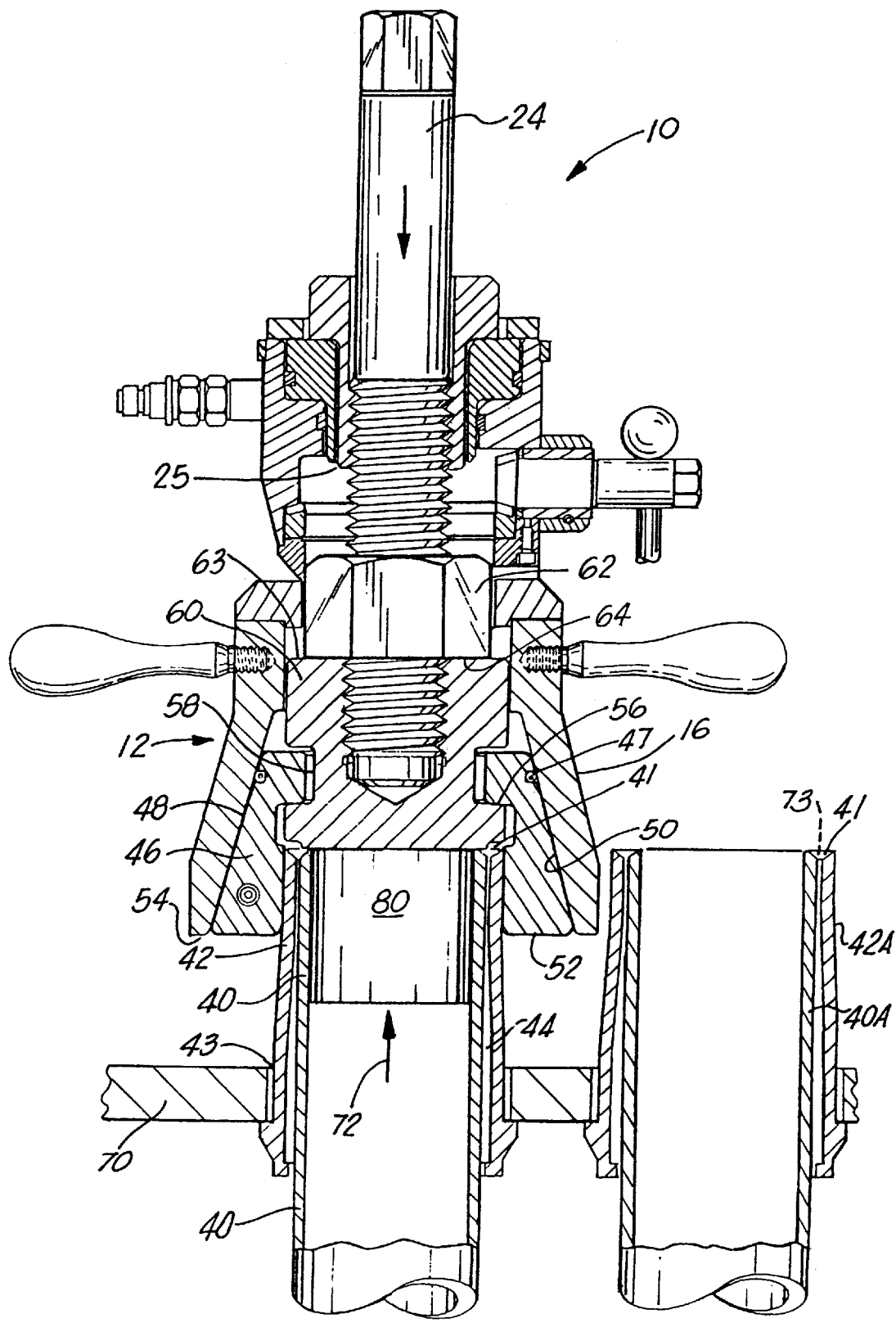
FIG. 2 illustrates a cross section view of the contractor assembly of the present invention placed upon a tube sleeve engaged around a heating tube.
Figure 10:
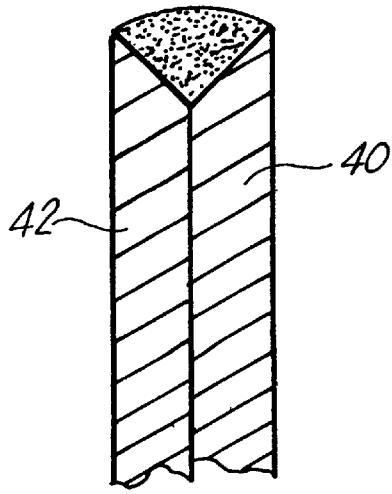
FIG. 10 illustrates a partial view of the respective ends of the tube and the sleeves as they are welded together at their flush end portions.

Turning now to FIG. 2, the contractor assembly 10 is again illustrated in cross section view where the internal workings of the assembly are clearly seen. As illustrated, the collar portion 12 has been engaged upon a heating tube 40 which has been surrounded by a sleeve member 42 which results in a measured gap 44 therebetween. As illustrated further in FIG. 2, the assembly 10 illustrates the conical side wall 16 of collar member 12 has been secured around a contour ring 46 with the contour ring 46 having an outer conical wall 48 which is matched against the interior surface 50 of the inner surface of conical wall 16 of collar 12. There is included an o-ring 47 there between for effecting a seal between the contour ring 46 and side wall 16 of collar member 12. It is noted that the lower end 52 of contour ring 46 is substantially flush with the end 54 of collar 12. Further, as illustrated, there is an upper shelf portion 56 on contour ring 46 which engages a shoulder 58 on a pull nut 60, into which collet stud 24 is threadably engaged. Again, collet stud 24 includes a plurality of threads 25 which threadably engages into a lower hex nut 62, the lower surface of which 64 engages against the upper surface 63 of pull nut 60. As further seen in FIG. 2, the heating tube 40 is secured within sleeve 42, both of which are engaged into an opening 43 in a tube sheet assembly 70. This provides a flow of heat through the inner bore 72 of tube 40 during use. For clarity of how tube 40 and sleeve 42 interrelate, reference is made to FIG. 2, where second pair of tubes 40A housed is within sleeve 42A, and which are adjacent the tube 40, sleeve 42, upon which the housing 10 is placed. It is noted that the upper ends 41 of the tube 40A and sleeve 42A are flush and would be welded in place after compression to provide a 100% leak free seal as seen in FIG. 10. Following the placement of the tubes in this flush relationship, the assembly 10 would have been placed upon the upper ends 41 of the tube 40 and sleeve 42 so that the process of compressing same would begin.

Figure 4:
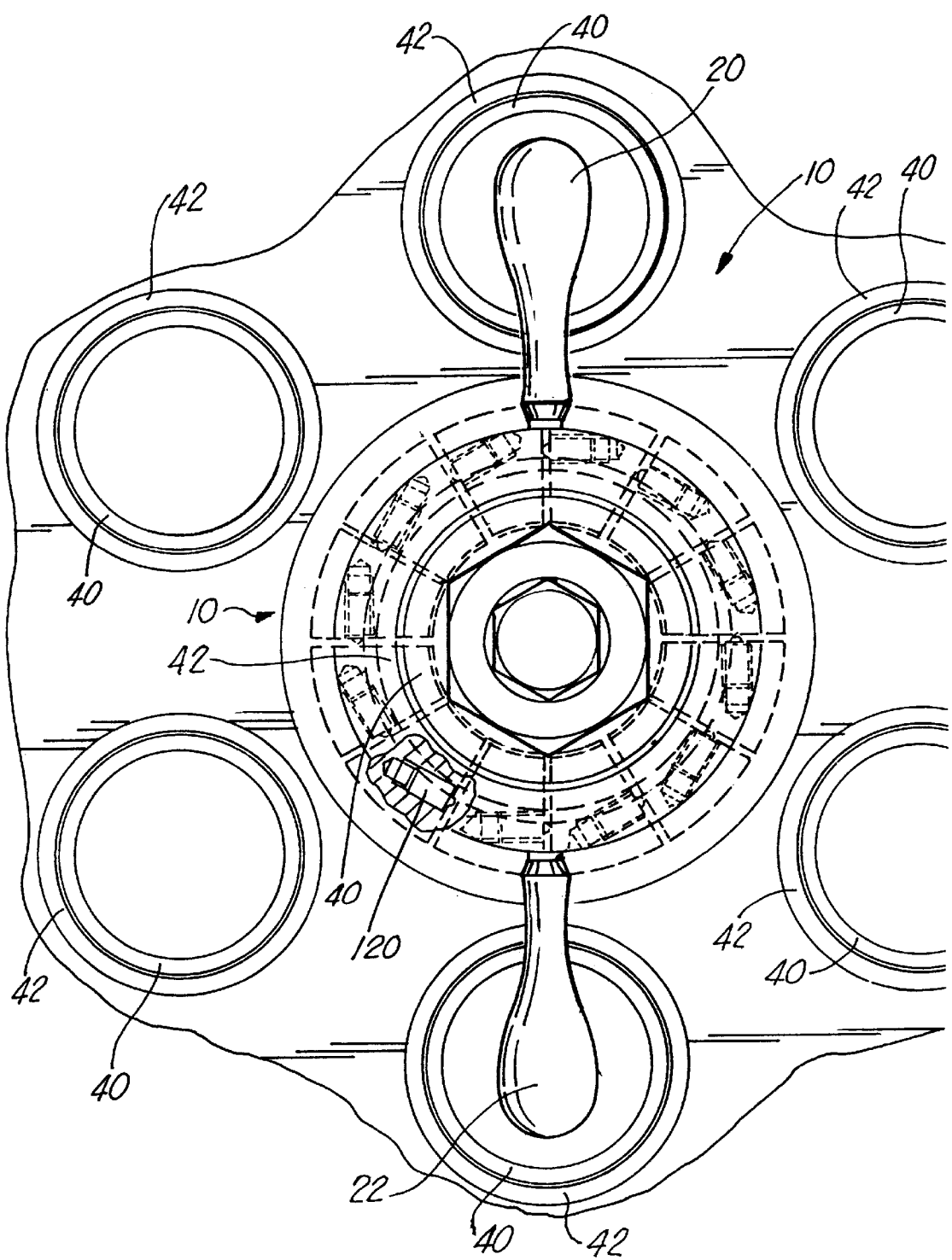
FIG. 4 illustrates a top view of the contractor assembly of the present invention placed upon a tube and tube sleeve.

FIG. 4 illustrates a top view of the assembly 10 placed upon a tube 40 and an outer sleeve 42. There is illustrated a plurality of members 120 which when the hydraulic force is placed upon the apparatus would tend to have the apparatus rotate so that when the compression force is exerted against the tube between tube 40 and sleeve 42, it is done in a circular fashion compressing equally around the entire circumferential surfaces of the tube members. As further illustrated in FIG. 4, there is seen the handle portions 20, 22, and the plurality of tubes 40 each of which have a sleeve 42 there around and positioned ready to accommodate the compactor assembly 10 after this particular tube upon which the assembly 10 is placed has been completed.

Figure 5:
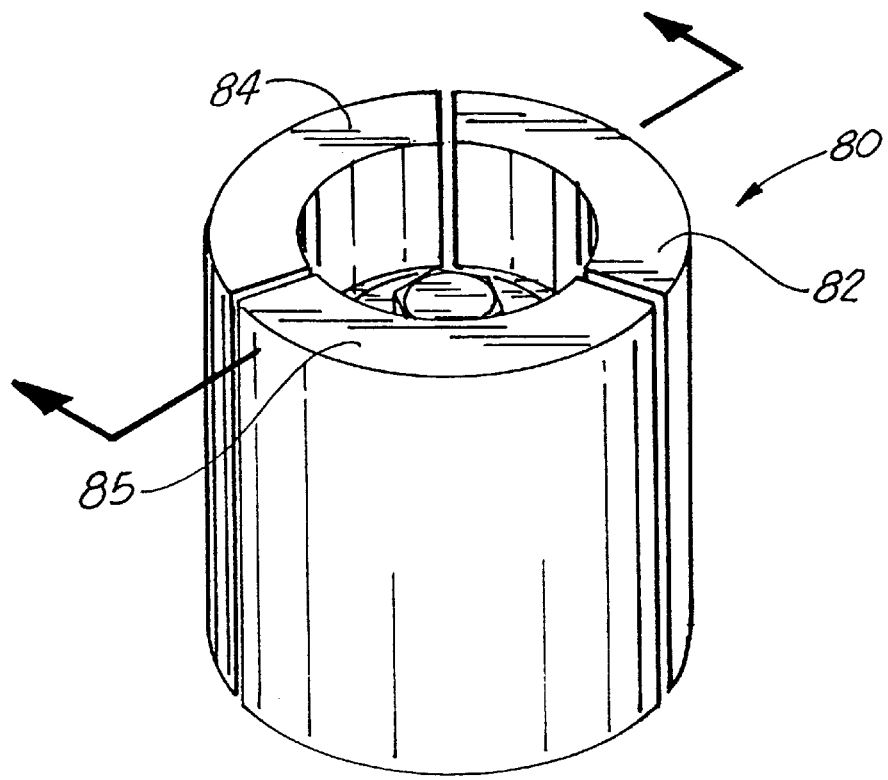
FIG. 5 illustrates an overall view of the tube insert utilized in the present invention.
Figure 6:
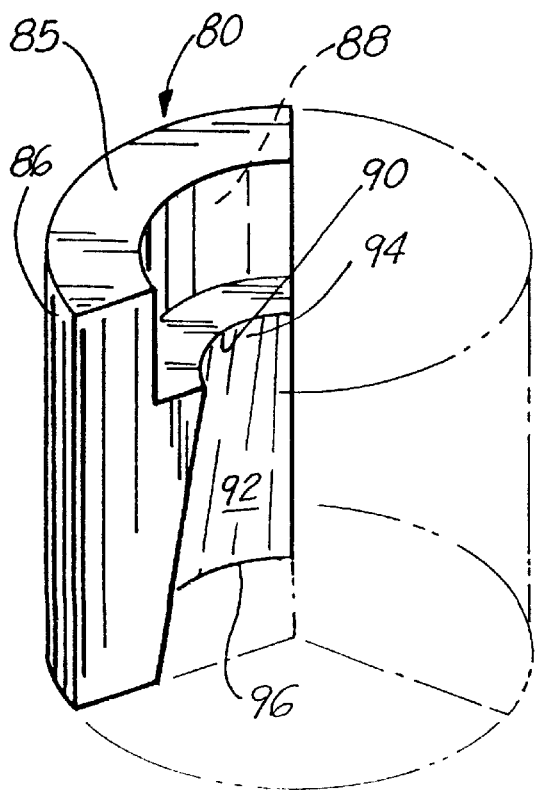
FIG. 6 illustrates a partial cut away view of the interior of the tube insert of the present invention.
Figure 7:
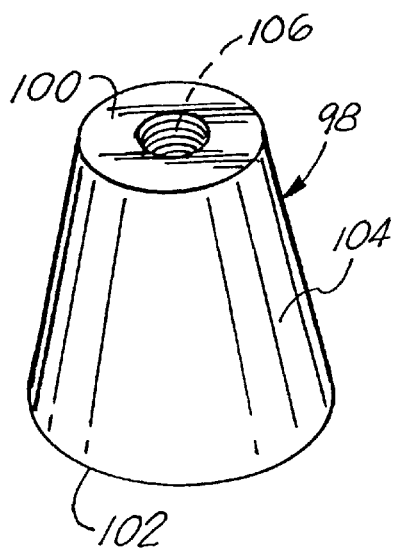
FIG. 7 illustrates an overall view of the truncated cone insertable into the insert utilized in the present invention.

Prior to a discussion of the operation of the assembly 10, reference should be made to FIGS. 5–7 which relate to a tube insert 80 which is seen in overall view in FIG. 5. Tube insert 80 includes three conical wedge members 82, 84 and 86, which when placed together, form the tube insert 80. For purposes of use, insert 80 would be positioned within the interior of tube 40 again as seen in FIG. 2 and would be secured therein. In FIG. 6, there is illustrated at least one of the wedge members, for example, 84, where there is illustrated the outer portion 85 of the tube showing the outer wall 86 and the interior or upper wall 88 and a lower conically shaped interior portion 90 where the inner wall 92 is formed in a cone. As illustrated, the upper end of the wall 92 forms the smaller end 94 of the cone and the lower end of the wall 92 forming the greater opening 96 of the cone. There is illustrated in FIG. 7 the truncated cone member 98 which would be inserted into the conical opening formed along wall 92 of the tube insert 80. The cone would include an upper surface 100, a lower broader surface 102 and a conically shaped wall 104. Cone 98 would also include a threaded bore 106, through its central axis, the function of which will be described further.

Figure 8A:
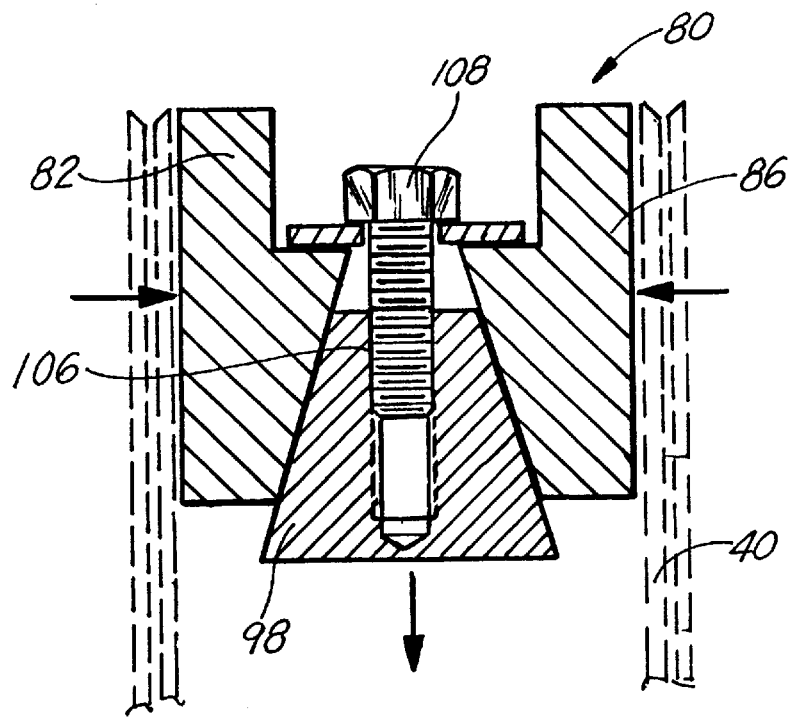
FIGS. 8A and 8B illustrate the movement of the truncated cone within the insert of the present invention for engaging the inner surface of the tube while the sleeve is being compressed there against.
Figure 8B:
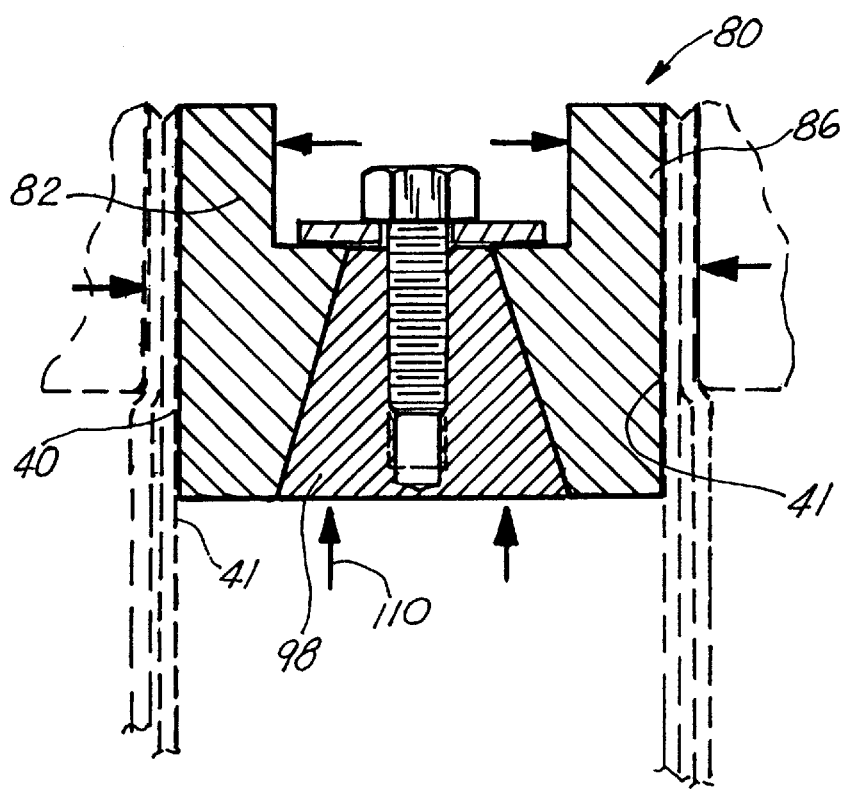

The function of the tube insert 80 is illustrated in FIGS. 8A and 8B. In FIG. 8A there is illustrated again the wedge members 82, 84 and 86 forming the insert 80 housed within the opening of tube 40. When the tube insert 80 is in place, the cone portion 98 is placed within the lower opening of the tube insert, and a threaded bolt member 108 is threadably engaged into threaded bore 106 of cone member 98. As is seen, when the threaded bolt member 108 is tightened, the cone member 98 is forced upward in the direction of arrows 110, thus forcing the sections 82, 84, 86 of tube insert 80 to expand outwardly and engage the interior surface 41 of the tube member 40. The result is that the interior surface 41 of tube 40, is supported along its length by the insert 80, for the purpose as will be discussed further.

Figure 3:
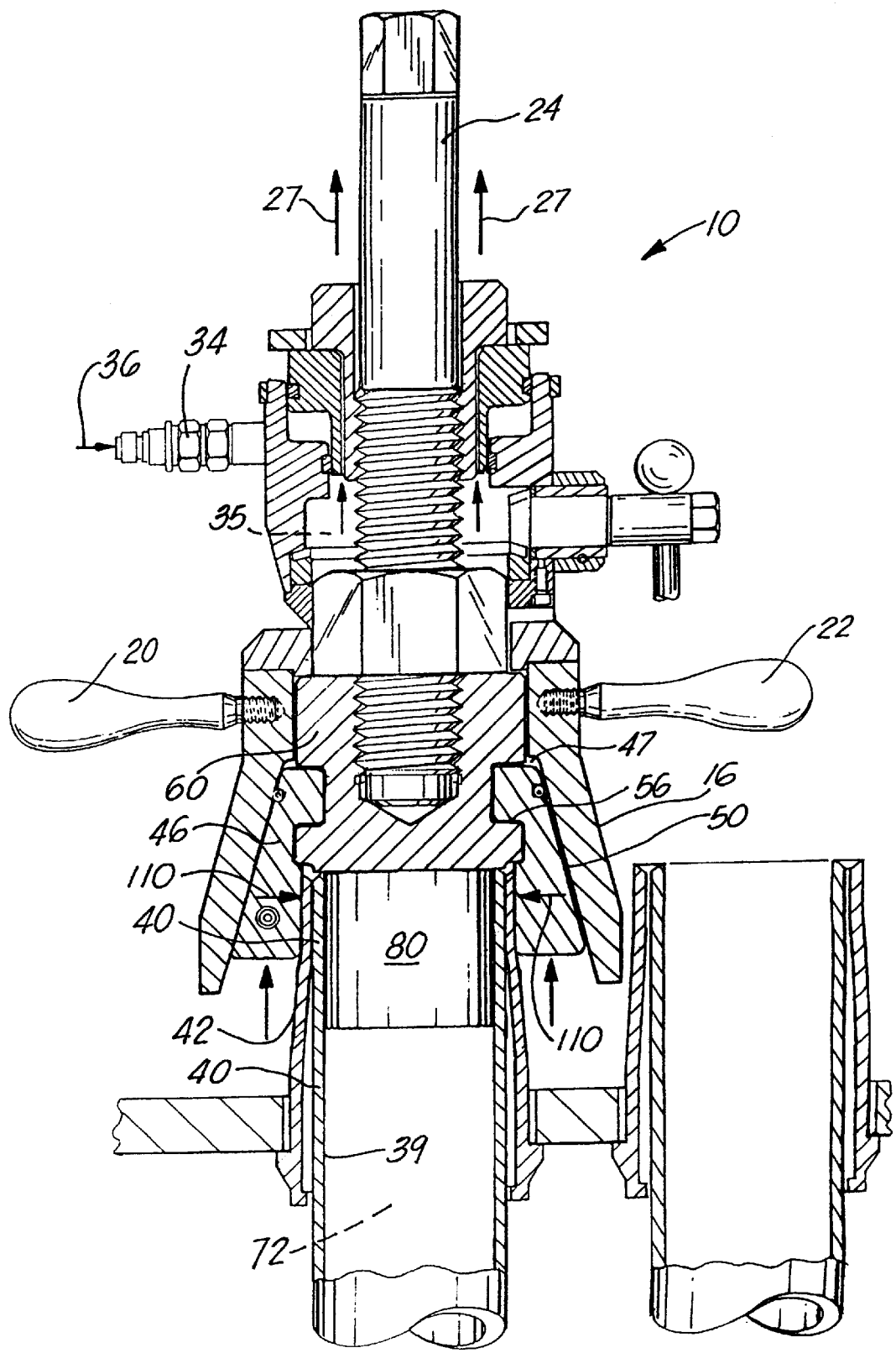
FIG. 3 illustrates the assembly of FIG. 2, with the assembly having mated the surfaces of the tube and the sleeve to within the specified range.

Returning now to the Figures, for example, in FIG. 3, there is illustrated again the assembly 10 secured upon the upper end of the tube 40, sleeve 42, with the handle portions 20, 22 having secured the assembly in place. In this position, there is clearly seen o-ring 47 support the surface between the collar 16 and the contour ring 46 to carry out the operation. As illustrated, upon insertion of hydraulic fluid in the direction of arrow 36 into the nipple assembly 34, the fluid would flow within the chamber 35 and force the collet stud 24 in the direction of arrows 27. When this occurs, there is imparted a slight rotation to the stud 24 as it is moved upward and likewise the pull nut 60 is likewise pulled in the direction of arrows 27. When this occurs, because the lower contour ring 46 is engaged by shoulder 56 of pull nut 60, the contour ring is pulled upward and therefore is forced more tightly against the inner surface 50 of the collar surface 16. This imparts inward force in the direction of arrow 110 on the outer sleeve 42 pressing it against the outer surface of ring 40.

As seen in FIG. 3, tube insert 80 has been inserted into the bore 72 of tube 40, and the interior or cone wedge 98 has been engaged within tube insert 80 so that the wall of tube insert 80 is pressed up against the interior wall 39 of tube 40. This is very important in view of the fact that when the contour ring presses the outer sleeve against the interior tube 40, the tube 40 could not depress or warp along its interior surface 39 because of the presence of the tube insert 80 preventing that from occurring. Therefore, pressure up to 14,000 p.s.i.g. could be placed on the mating between the tube 40 and the sleeve 42 so as to achieve the 0.005 inch gap between the tube 40 and ring 42, which is a sufficient gap for proper sealing between the tube 40 and the sleeve 42.

Figure 9:
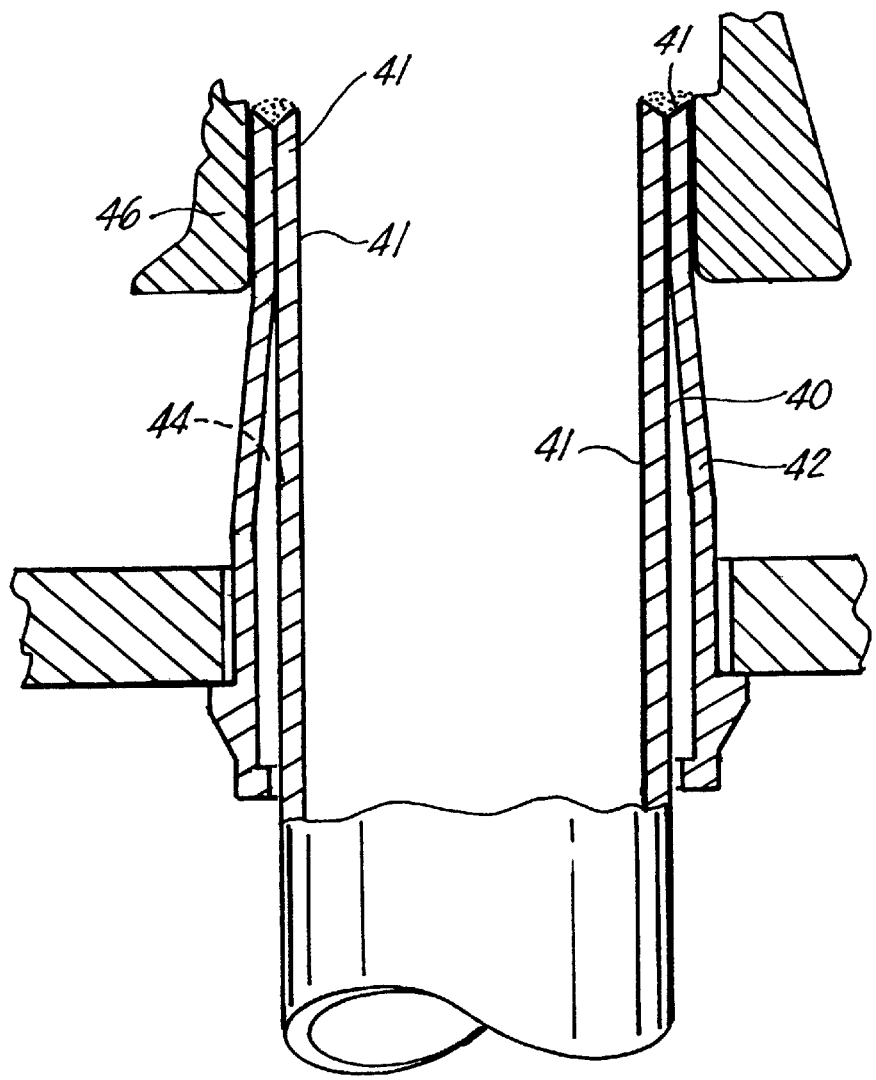
FIG. 9 illustrates a cross section cut away view of the relationship between the tube and the outer sleeve during the compression operation.

Reference is made to FIG. 9 where there is seen in representational cross section view, a view of the inner tube 40 and the outer sleeve 42 matingly engaged along their upper ends 41 by the contour ring 46. As seen in the Figure, it is noted that there still remains a gap 44 at the lower portions between tube 40 and sleeve 42 but after the contour ring 46 has moved upward, it has compressed the outer sleeve 42 against inner tube 40 during the process. It should be kept in mind though, when this occurred, the tube insert 80 was in place and FIG. 9 represents the point where the tube insert 80 has been removed and the result is the continuous flat, smooth inner surface 39 of tube 40 despite the enormous compression force that was pressed against tube 41 in mating with sleeve 42 by contour ring 46.

The foregoing embodiments are presented by way of example only; the scope of the present invention is to be limited only by the following claims.

What is claimed is:

1. A system for securing a seal between a heating tube and a surrounding sleeve, comprising:
    a. a heating tube of the type having a continuous wall portion and a bore therethrough;
    b. a sleeve positionable around the heating tube, the diameter of the sleeve slightly larger than the diameter of the heating tube;
    c. a contracting assembly securably atop the end portions of the heating tube and the surrounding sleeve;
    d. an insert positionable within the bore of the tube, for defining a non-deformable member along a portion of the inner wall of the tube;
    e. a contour ring moveable along the outer surface of the sleeve for compressing the sleeve wall against the tube wall to define a sealable gap between a portion of the sleeve and a portion of the tube.

2. The system in claim 1 wherein the heating tube and sleeve are welded together at their upper ends after compression.

3. The system in claim 1 wherein the contracting assembly further comprises a cone portion positionable on the ends of the tube and sleeve.

4. The system in claim 1, wherein the contracting assembly further comprises a threaded stud member moveable within the contracting assembly and engaged to a pull nut on its lower end.

5. The system in claim 4, wherein the contour ring is moveable by the upper movement of the pull nut.

6. The system in claim 4, further comprising hydraulic fluid into the contracting assembly for imparting longitudinal movement to the threaded stud member.

7. The system in claim 1, wherein the tube insert provides a means for maintaining the tube wall straight and smooth despite the sleeve imparting force thereagainst to provide the seal between the tube and the sleeve.

8. The system in claim 1, wherein the contour ring imparts a sufficient pressure to cause a permanent deformation of the sleeve which results in reducing the initial gap size between the sleeve and the tube.

9. The system in claim 1, wherein the gap defined between the tube and sleeve walls after the contour ring has imparted the force would be less than 0.005 inches.

10. A process for securing a seal between a heating tube and a surrounding sleeve, comprising the following steps:
    a. providing a heating tube having a substantially continuous wall portion and a bore therethrough;
    b. positioning a sleeve around the heating tube, the diameter of the sleeve slightly larger than the diameter of the heating tube;
    c. placing a contracting assembly securably atop the end portions of the heating tube and the surrounding sleeve;
    d. providing a contour ring along the outer surface of the sleeve, the contour ring carried by the contracting assembly;

e. positioning an insert within the bore of the tube, for defining a non-compressible member along a portion of the inner wall of the tube;

f. moving the contour ring along the outer wall of the sleeve to compress the sleeve wall against the tube wall at a point opposite the position of the tube insert, for forming a sealable gap between a portion of the sleeve and a portion of the tube.

11. The process in claim 10, comprising the step of welding the tube and sleeve together at their upper ends after compression with the contracting assembly to form a total seal.

12. The process in claim 10, wherein the contracting assembly further comprises a cone portion positionable over the ends of the tube and sleeve, and carrying the contour ring.

13. The process in claim 10, further comprising the step of moving a threaded stud member threadably engaged within the contracting assembly to move a pull nut on its lower end.

14. The process in claim 10, further comprising the step of rotating the threaded stud so that the contour ring is moved upward by the pull nut for compressing the sleeve wall.

15. The process in claim 10, further comprising the step of introducing hydraulic fluid into the contracting assembly for imparting longitudinal movement to the threaded stud member.

16. The process in claim 10, wherein the step of positioning the tube insert within the tube bore provides a means for maintaining the tube wall straight and smooth while the sleeve is being depressed against the tube wall by the contour ring providing the seal between the tube and the sleeve.

17. A system for providing a seal between a heating tube and a surrounding sleeve, without deforming the tube wall, comprising:

a. a heating tube of the type having a continuous wall portion and a bore therethrough;

b. a sleeve positionable around the heating tube, the diameter of the sleeve slightly larger than the diameter of the heating tube;

c. a contracting assembly securable atop the end portions of the heating tube and the surrounding sleeve;

d. an insert positionable within the bore of the tube, for defining a non-compressible member along a portion of the inner wall of the tube;

e. a contour ring carried by the contracting assembly and moveable along the outer surface of the sleeve for compressing the sleeve wall against the tube wall at the point of the tube insert to define a sealable gap between a portion of the sleeve and a portion of the tube, while maintaining the tube wall smooth and straight.

18. An improved system for forming a seal between a heating tube and a surrounding sleeve, without deforming the tube wall, of the type wherein there is provided a heating tube of the type having a continuous wall portion and a bore therethrough; a sleeve positionable around the heating tube, the diameter of the sleeve slightly larger than the diameter of the heating tube; a contracting assembly securable atop the end portions of the heating tube and the surrounding sleeve; a contour ring carried by the contracting assembly and moveable along the outer surface of the sleeve for compressing the sleeve wall against the tube wall to define a sealable gap between a portion of the sleeve and a portion of the tube, the improvement comprising:

a member insertable into the bore of the tube, at a point opposite the position of the contour ring, the member expandable to tightly engage the tube wall, so that when the sleeve is compressed against the tube by the contour ring, the sealable gap is formed, yet the tube wall is maintained straight and smooth.

19. The system in claim 18, wherein the contour ring imparts sufficient force (75000 lbf or greater) against the sleeve to compress the sleeve against the tube wall.

20. The system in claim 18, wherein the gap defined between the tube and sleeve walls after the contour ring has imparted the force would be less than 0.005 inches.

\* \* \* \* \*